Patented May 20, 1941

2,242,411

UNITED STATES PATENT OFFICE 2,242,411

VAT DYESTUFFS OF THE ANTHRAQUINONE SERIES AND PROCESS OF MAKING THE SAME

Wilhelm Bauer, Leverkusen-Wiesdorf, Germany, assignor to General Aniline & Film Corporation, a corporation of Delaware No Drawing. Application September 1, 1938, Serial No. 227,965. In Germany September 4, 1937

4 Claims. (Cl. 269—277)

My present invention relates to new and valuable vat dyestuffs of the anthraquinone series and to a process of making the same.

The new dyestuffs correspond to the following general formula

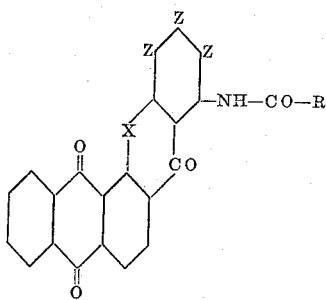

wherein X stands for a member of the group consisting of —NH— or —S—, Z stands for a member of the group consisting of hydrogen and a group which does not effect solubility and R represents a radical of a vattable compound.

Preferred groups which do not effect solubility are, for instance, halogen atoms, alkoxy or aryloxy groups.

Preferred radicals of compounds which are capable of being vatted are anthraquinone radicals, though radicals of other vattable compounds, for instance of benzanthrone, anthanthrone, violanthrone, pyrazole anthrone or of indigoid compounds are not excluded. These radicals may contain further substituents, for instance amino, acylamino, halogen or alkoxy groups.

My new dyestuffs represent dark colored crystals being sparingly soluble in organic solvents which dissolve easily in the hydrosulfite vat and dye vegetable fibers fast clear red to blue shades. By using the dyestuffs in the rongalite-potash-print they yield on cotton and artificial silk full prints of excellent fastness properties.

The new dyestuffs are obtained by condensing in the presence of a suitable solvent, for instance nitrobenzene, anthraquinone-2.1- (N) -1'.2'-(N) - 6' - aminobenzacridones or anthraquinone - 2.1 - (S) -1'.2'- (S) - 6' - aminobenzthioxanthones with monocarboxylic acid halides, preferably chlorides of compounds capable of being vatted. Suitable carboxylic acid halides of this type are, for instance, the carboxylic acid halides of the anthraquinone carboxylic acids, nitro- or aminoanthraquinone carboxylic acids, 2 - phenyl-anthraquinone-Bz-4-carboxylic acid, pyrazole-anthrone-2-carboxylic acid, 8-hydroxy-1.2-naphthoxy-phenazine-Bz-carboxylic acid and carboxylic acids of indigoid compounds.

The anthraquinone- 2.1 - (N) - 1'.2' - (N) - 6' - aminobenzeneacridones or -2.1-(S) -1'.2'-(S) -6'- aminobenzthioxanthones respectively employed as starting materials can be obtained from the corresponding nitro derivatives by reduction or from the 6'-halogen derivatives by replacing the halogen through the amino group or through acid amide radicals and saponification.

The following examples illustrate the invention, without, however, restricting it thereto, the parts being by weight:

Example 1

A mixture consisting of 80 parts of anthraquinone-2.1 - (N) -1'.2'- (N) - 3'.6' - dichlorobenzene-acridone, 70 parts of p-toluene-sulfamide, 20 parts of anhydrous potassium acetate, 700 parts of nitrobenzene and 2 parts of copper acetate is heated for 3 hours to 205° C. while stirring, the acetic acid thus formed being distilled off. The separated crystals are filtered with suction at a temperature of 55° C., washed with chlorobenzene, alcohol and water and then dried. The sulfamide forms violet needles. For saponification 100 parts of this product are dissolved in 600 parts of concentrated sulfuric acid and heated to 60–70° C. for half an hour; then the reaction product is poured into water, stirred for one hour, filtered with suction, washed and dried. The anthraquinone-2.1-(N) -1'.2'(N) -3'- chloro- 6' - aminobenzene-acridone forms blue needles. Then 35 parts of this aminoacridone, 30 parts of 1-aminoanthraquinone-2-carboxylic acid chloride and 800 parts of nitrobenzene are heated to 160–170° C. for one hour while stirring. The dyestuff separating in a very good yield is filtered with suction in the heat, washed with hot chlorobenzene and with alcohol and dried. It forms violet needles scarcely soluble in organic solvents yielding on the fiber from a dull-violet hydrosulfite vat clear bluish bordored shades of a good fastness to chlorine, boiling and light. In the rongalite-potash-print the dyestuff yields on cotton and artificial silk deep clear bordored shades of a very good fastness.

Example 2

By using in the above example instead of anthraquinone-3'-chloro-6'-aminobenzene-acridone the equivalent quantity of anthraquinone - 6' - aminobenzene-acridone, a similar dyestuff is obtained, yielding from a dull-violet vat more reddish bordo shades.

Anthraquinone-6'- aminobenzene-acridone can easily be obtained by causing anthraquinone-6'-chlorobenzene-acridone (obtainable according to U. S. Patent 1,967,364) to react with p-toluene-sulfamide and saponifying the reaction product with sulfuric acid. Another way to obtain the above product is by reducing anthraquinone-6'-nitroacridone, the latter being prepared by causing 1-chloroanthraquinone-2-carboxylic acid to react with m-nitraniline in the usual manner.

Example 3

By causing 35 parts of anthraquinone-2.1-(N)-1'.2'-(N)-3'-chloro-6'-aminobenzene-acridone to react with 30 parts of 1-nitroanthraquinone-2-carboxylic acid as indicated in Example 1, a dyestuff in form of red-brown needles is obtained yielding from a violet hydrosulfite vat on the fiber bordo shades, being similar to those of Example 1 but of a more intensive blue.

Example 4

A mixture of 30 parts of anthraquinone-2.1-(N)-1'.2'-(N)-3'.4'.6'-trichlorobenzene-acridone, 23.5 parts of p-toluene-sulfamide, 7.5 parts of glowed potassium acetate, 200 parts of nitrobenzene and 1 part of copper acetate is heated to 190° C. for 3 hours while stirring. The reaction product is filtered with suction at a temperature of 50° C., washed, dried and saponified by heating it for half an hour with the 6-fol quantity of concentrated sulfuric acid to 60–70° C. When poured into water, stirred, filtered with suction, washed and dried, the anthraquinone-3'.4'-dichloro-6'-aminobenzene-acridone is obtained in form of blue needles.

A mixture of 16.3 parts of anthraquinone-3'.4'-dichloro-6'-aminobenzene-acridone, 13 parts of 1-aminoanthraquinone-2-carboxylic acid chloride and 400 parts of nitrobenzene is heated for 2 hours to 170° C. while stirring, filtered with suction at 120° C. washed and dried. The reaction product represents a dyestuff forming violet needles, which are soluble in concentrated sulfuric acid with a red color and are unsoluble in organic solvents. It yields on cotton from a violet vat as well as in the rongalite-potash-print clear ruby-red shades of an excellent fastness.

Example 5

A mixture of 24 parts of 3'-phenoxy-6'-chloroanthraquinone - 2.1 - (N)-1'.2'-(N)-benzeneacridone (obtainable according to U. S. Patent 2,097,-112), 17 parts of p-toluenesulfamide, 5 parts of anhydrous potassium acetate, 175 parts of nitrobenzene and 1 part of copper acetate is heated for 2 hours to 210° C. while stirring. The reaction product is filtered with suction at a temperature of 50° C., washed and dried. It is saponified by heating it for half an hour with the 10-fold quantity of a 85% sulfuric acid to a temperature of 95° C. On cooling the amine crystallizes out in form of the sulfate. It is filtered with suction with the aid of a suitable filter, washed with some 85% sulfuric acid, decomposed with water having an addition of alkali, filtered with suction, washed and dried. The 3'-phenoxy-6'-aminoanthraquinonebenzeneacridone represents a blue crystalline powder.

By aroylating the reaction product with the necessary quantity of 1-aminoanthraquinone-2-carboxylic acid chloride in nitrobenzene at a temperature of 160–170° C., a dyestuff is obtained in form of violet needles in a very good yield, being unsoluble in organic solvents and dyeing cotton from a dull-violet hydrosulfite vat strong violet shades of a very good fastness to chlorine, boiling and light.

Example 6

By causing the anthraquinone-3'-chloro-6'-aminobenzene-acridone used in Example 1 to react with 1-amino-4-nitroanthraquinone-2-carboxylic acid chloride, reducing in the dyestuff, obtained in form of brown needles, the nitro group and benzoylating it, a vat dyestuff is obtained yielding from the vat strong reddish blue shades.

Example 7

Anthraquinone - 3' - chloro - 6' - aminobenzeneacridone is acylated with the chlorides of the following acids:

| Acid | Result | Color of the vat | Color on cotton |
|---|---|---|---|
| Anthraquinone-2-carboxylic acid | Violet needles | Dull-violet | Dull-ruby. |
| 1.9-pyrazole-anthrone-2-carboxylic acid | Brown needles | Violet | Violet. |
| 2-phenylanthraquinone-4'-carboxylic acid | Blue needles | Brown-violet | Ruby. |
| Isophthalic acid converted with one mol of 1-amino-5-benzoylaminoanthraquinone. | Dark crystal powder. | Dull-violet | Brown. |
| 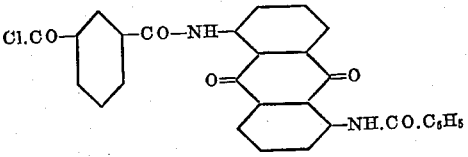 | | | |
| 8-oxy-1.2-naphthophenazine-Bz-carboxylic acid 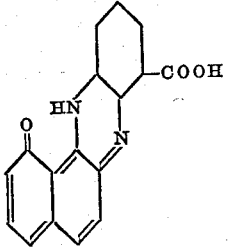 obtainable by causing to react o-phenylenediamine-3-carboxylic acid with β-naphthoquinone-8-sulfonic acid and subsequent alkali fusion. | Brown-black crystal powder. | Bordo | Red-brown. |

Example 8

2.4-dichloroaniline-6-sulfonic acid is transformed with the aid of the diazo compound by the Sandmeyer's reaction in the 2.3.5-trichlorobenzene-1-sulfonic acid and the latter is transformed in the 2.3.5-trichlorophenylmercaptane by reducing the corresponding sulfochloride. When converted this mercaptane with 1-chloroanthraquinone-2-carboxylic acid and subsequent formation of the thioxanthone ring there is obtained the anthraquinone - 2.1-(S)-1'.2'-(S)-3'.4'.6' - trichlorobenzene-thioxanthone forming yellow needles and yielding on the fiber from a blue hydrosulfite vat greenish yellow shades.

A mixture of 44.5 parts of this anthraquinone-trichloro-thioxanthone, 30 parts of p-toluene-sulfamide, 10 parts of anhydrous potassium acetate, 300 parts of nitrobenzene and 1 part of copper acetate is heated to 205° C. for 2 hours. The product which separates on cooling is filtered with suction while being hot, washed, dried and saponified by heating it for half an hour with concentrated sulfuric acid at a temperature of 80° C. The amine obtained by pouring out the reaction mixture into water, filtering with suction, washing and drying, represents a blue powder.

21 parts of the anthraquinone-3'.4'-dichloro-6' - aminobenzene-thioxanthone thus obtained are stirred with 15 parts of 1-aminoanthraquinone-2-carboxylic acid chloride in 400 parts of trichlorobenzene to 170° C. The dyestuff obtained is filtered with suction in the heat, washed and dried. It forms a dark red crystal powder being unsoluble in organic solvents and yields on cotton from an olivish black-brown hydrosulfite vat a strong clear red of very good fastness to chlorine, boiling and light.

Example 9

A mixture of 42 parts of 6-ethoxy-2-thionaphthene - 3'-indol-indigo-7'-carboxylic acid chloride, 38 parts of anthraquinone-2.1-(N)-1'.2' - (N) - 3'.4' - dichloro - 6 - aminobenzene-acridone and 800 parts of trichlorobenzene is heated for 3 hours to 170° C. while stirring. The dyestuff then separated is filtered with suction, washed with organic solvents and dried It represents red-brown crystals being unsoluble in organic solvents The solution in concentrated sulfuric acid has a wine-red color. Red flakes are separated when diluted with water. After having been oxidized the dyestuff yields from a bordo-colored hydrosulfite vat on the fiber strong fast yellowish red shades.

The acid chloride mentioned above is obtained by causing the indigoid substance (prepared from 6-ethoxythionaphthene and isatine-7-carboxylic acid according to U. S. Patent 1,890,718, Example 4) to react with thionyl chloride.

Example 10

By using 27.5 parts of anthraquinone-2.1-(N)-1'.2' - (N)-4'.6'-dichlorobenzene-acridone (obtainable from 3.5-dichloroaniline and 1-nitro-, 1-halogenanthraquinone-2-carboxylic acid respectively) instead of 30 parts of anthraquinone-2.1 - (N) - 1'.2' - (N)-3'.4'.6'-trichlorobenzene-acridone, the anthraquinone-4'-chloro-6'-aminobenzene-acridone is obtained in form of blue needles. By conversion of 15 parts of this amine with 13 parts of 1-aminoanthraquinone-2-carboxylic acid chloride there results a vat dyestuff in form of violet needles bearing one chlorine atom less than the above. It is soluble in concentrated sulfuric acid with a red color and yields on cotton from a violet vat clear fast ruby-red shades being more yellowish than those of the dyestuff according to Example 4.

I claim:

1. The dyestuff of the following formula

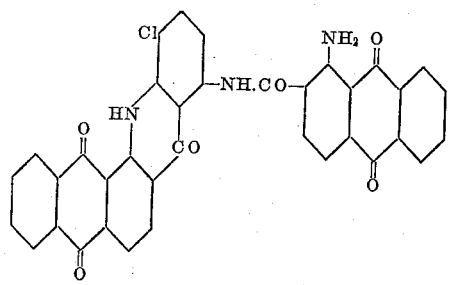

2. The dyestuff of the following formula

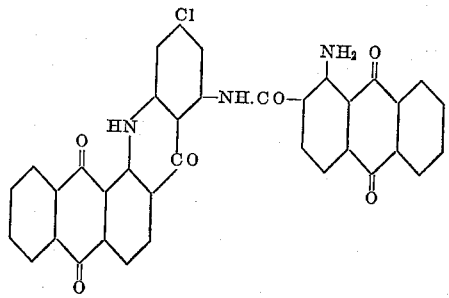

3. The dyestuff of the following formula

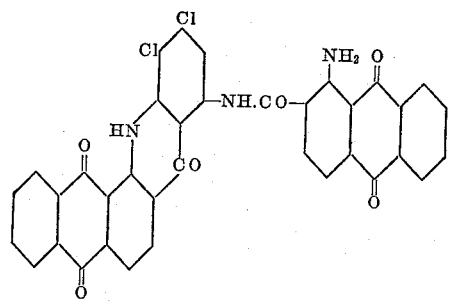

4. Vat dyestuffs of the general formula:

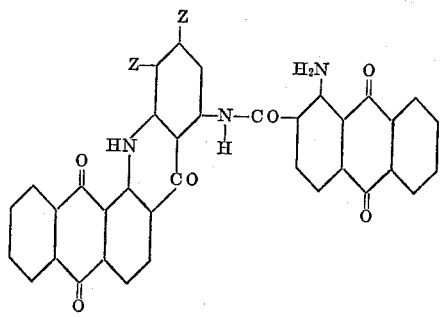

wherein Z stands for a member of the group consisting of hydrogen and halogen, at least one of the Z's being halogen.

WILHELM BAUER.